United States Patent
Sakashita et al.

(10) Patent No.: US 10,558,383 B2
(45) Date of Patent: Feb. 11, 2020

(54) STORAGE SYSTEM

(71) Applicant: HITACHI, LTD., Tokyo (JP)

(72) Inventors: Yuki Sakashita, Tokyo (JP); Takeru Chiba, Tokyo (JP); Sadahiro Sugimoto, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 19 days.

(21) Appl. No.: 15/755,986

(22) PCT Filed: Oct. 8, 2015

(86) PCT No.: PCT/JP2015/078652
§ 371 (c)(1),
(2) Date: Feb. 27, 2018

(87) PCT Pub. No.: WO2017/061008
PCT Pub. Date: Apr. 13, 2017

(65) Prior Publication Data
US 2018/0246668 A1    Aug. 30, 2018

(51) Int. Cl.
*G06F 3/06* (2006.01)
(52) U.S. Cl.
CPC .......... *G06F 3/0646* (2013.01); *G06F 3/0604* (2013.01); *G06F 3/067* (2013.01)
(58) Field of Classification Search
CPC ......... G06F 3/0646; G06F 3/061; G06F 3/067
See application file for complete search history.

(56) References Cited

U.S. PATENT DOCUMENTS

| | | | | |
|---|---|---|---|---|
| 5,724,552 A | * | 3/1998 | Taoda | G06F 3/061 707/999.202 |
| 2002/0194526 A1 | * | 12/2002 | Ulrich | G06F 3/061 714/6.12 |
| 2005/0216665 A1 | | 9/2005 | Takakuwa | |
| 2014/0372720 A1 | | 12/2014 | Miura et al. | |
| 2015/0324145 A1 | | 11/2015 | Akutsu et al. | |
| 2015/0370484 A1 | | 12/2015 | Kawaguchi et al. | |

FOREIGN PATENT DOCUMENTS

| | | |
|---|---|---|
| JP | H07-036634 A | 2/1995 |
| JP | 2005-284632 A | 10/2005 |
| JP | 2014-241117 A | 12/2014 |
| WO | 2014/115320 A1 | 7/2014 |
| WO | 2015/025363 A1 | 2/2015 |

OTHER PUBLICATIONS

International Search Report for WO 2017/061008 A1, dated Jan. 12, 2016.

* cited by examiner

*Primary Examiner* — Edward J Dudek, Jr.
(74) *Attorney, Agent, or Firm* — Volpe and Koenig, P.C.

(57) ABSTRACT

A storage system includes a plurality of nodes connected with a network and configured to provide volumes, a plurality of drive units; and a management system. Each of the plurality of drive units consists of a plurality of storage drives and is accessible from one or more of the plurality of nodes without intervention of the other nodes. The management system or one of the plurality of nodes is configured to determine number of storage drives to be included in a new distribution range to distribute data of a first volume based on access frequency to the first volume.

10 Claims, 12 Drawing Sheets

| VOLUME NUMBER 411 | OWNER NODE 412 | AUTOMATIC REALLOCATION 413 | ASSOCIATED POOL 414 | NUMBER OF DU'S 415 | DISTRIBUTION BITMAP 416 | REBUILD TIME 417 | I/O ACCESS COUNT 418 |
|---|---|---|---|---|---|---|---|
| 0 | 0 | 1 | 1 | 1 | 00000001 | 60 | 100 |
| 1 | 1 | 1 | 1 | 3 | 00000111 | 20 | 10 |
| 2 | 2 | 1 | 1 | 1 | 00000100 | 30 | 200 |
| 3 | 2 | 1 | 1 | 2 | 00000110 | 45 | 50 |
| 4 | 0 | 0 | 2 | 3 | 00001111 | 60 | 500 |
| 5 | 1 | 0 | 2 | 3 | 00001111 | 20 | 300 |
| 6 | 2 | 0 | 2 | 3 | 00001111 | 20 | 1000 |
| 7 | 3 | 0 | 2 | 3 | 00001111 | 20 | 150 |

VOLUME MANAGEMENT TABLE 241

FIG. 6

| POOL NUMBER | DU NUMBER | PG NUMBER | CONNECTED NODE | NUMBER OF DRIVES | RAID | DRIVE TYPE | DU FREE SPACE |
|---|---|---|---|---|---|---|---|
| 431 | 432 | 433 | 434 | 435 | 436 | 437 | 438 |
| 1 | 1 | 1 | 1,2 | 8 | 7D1P | HDD-300G-10K | 3000 |
|   | 1 | 2 | 1,2 | 8 | 7D1P | HDD-300G-10K |  |
|   | 2 | 1 | 1,2 | 8 | 7D1P | HDD-300G-10K | 4000 |
|   | 2 | 2 | 1,2 | 8 | 7D1P | HDD-300G-10K |  |
|   | 3 | 1 | 3 | 8 | 7D1P | HDD-300G-10K | 5000 |
|   | 3 | 2 | 3 | 8 | 7D1P | HDD-300G-10K |  |
|   | 3 | 3 | 3 | 8 | 7D1P | HDD-300G-10K |  |
|   | 4 | 1 | 4 | 8 | 7D1P | HDD-300G-10K | 1000 |
| 2 | 1 | 3 | 1,2 | 4 | 3D1P | HDD-600G-15K | 1000 |
|   | 2 | 3 | 1,2 | 4 | 2D2D | SSD-800G-A | 2000 |
|   | 4 | 1 | 4 | 8 | 6D2P | SSD-400G-B | 2000 |
|   | 4 | 2 | 4 | 8 | 7D1P | SSD-400G-B | 500 |

POOL MANAGEMENT TABLE
243

*FIG. 7*

THROUGHPUT MANAGEMENT TABLE 245

| FIRST CATEGORY 451 | SECOND CATEGORY 452 | THROUGHPUT 453 |
|---|---|---|
| HDD | HDD-300G-7K | 100 |
| | HDD-300G-10K | 125 |
| | HDD-300G-15K | 150 |
| | HDD-600G-7K | 100 |
| | HDD-600G-10K | 125 |
| | HDD-600G-15K | 150 |
| SSD | SSD-400G-A | 200 |
| | SSD-400G-B | 250 |
| | SSD-400G-A | 200 |
| | SSD-800G-B | 250 |
| INTERFACE | NODE-TO-NODE INTERFACE | 2000 |

FIG. 8

ALLOCATED SPACE MANAGEMENT TABLE 247

| VVOL (0) | | DRIVE NUMBER | | | | | | | ... |
|---|---|---|---|---|---|---|---|---|---|
| | | PG(0) | | | | PG(1) | | | ... |
| | | 1 | 2 | ... | 8 | 1 | 2 | ... | 8 | ... |
| DU NUMBER | 1 | R(0,1,1) | R(0,1,2) | ... | R(0,1,8) | R(1,1,1) | R(0,1,2) | ... | R(1,1,8) | ... |
| | 2 | R(0,2,1) | R(0,2,2) | ... | R(0,2,8) | R(1,2,1) | R(0,2,2) | ... | R(1,2,8) | ... |
| | ... | ... | ... | ... | ... | ... | ... | ... | ... | ... |
| | 8 | R(0,8,1) | R(0,8,2) | ... | R(0,8,8) | R(1,8,1) | R(0,8,2) | ... | R(1,8,8) | ... |

FIG. 9

STORAGE SYSTEM

BACKGROUND

This invention relates to a storage system.

Storage systems have conventionally employed a scheme that configures a RAID (redundant array of inexpensive disks) group with a plurality of storage devices to provide a host computer with a logical volume created based on the RAID group.

As a technique related to RAID, PTL1 discloses a so-called distributed RAID that manages stripes including normal data and redundant data for restoring the normal data by distributing them to a plurality of storage devices providing their storage areas to a capacity pool.

Specifically, PTL1 discloses: A storage system is equipped with: multiple storage devices; and a control unit that provides predetermined storage areas of the multiple storage devices to a host computer as a virtual volume group that includes one or more virtual volumes. The control unit configures one or more data sets having a redundancy level of one or greater from the multiple storage devices, provides a storage area for a capacity pool which includes the multiple data sets to portions of the storage areas of the virtual volumes, limits the combinations of storage devices for configuring the data sets to be allocated to a virtual volume to a fixed number of combinations equal to or greater than two, evenly disperses the storage devices that appear in the fixed number of combinations in the storage area inside the capacity pool, and uses a fixed number of different combinations of storage devices to be allocated to the virtual volumes per virtual volume group (Abstract).

Meanwhile, Server SAN storage system is known as a type of distributed storage system, in which a plurality of servers (computers) are connected by a network to create a capacity pool. A Server SAN storage system uses local storage devices connected directly with server nodes as terminal storage; write data and its redundant data are distributed to the plurality of server nodes to protect the data.

PATENT LITERATURE

PTL1: WO 2014/115320 A

SUMMARY

When a failure occurs in one of the drives constituting a RAID group holding redundant data, the storage system rebuilds the data stored in the failed drive to a spare drive included in the storage system using redundant data. The rebuild can be expedited by managing distribution of stripe columns including a plurality of stripes to the plurality of storage devices providing their storage areas to the capacity pool to raise the parallelism of the storage devices, as disclosed in WO 2014/115320 A.

However, under the configuration where the write data and parities included in a stripe column are distributed to a plurality of nodes like the configuration of the Server SAN storage system, communication between nodes is necessary to read old data/parities from storage devices of other nodes in generating a parity when writing data. This operation degrades the I/O performance.

An aspect of this invention is a storage system including a plurality of nodes connected with a network and configured to provide volumes, a plurality of drive units; and a management system. Each of the plurality of drive units consists of a plurality of storage drives and is accessible from one or more of the plurality of nodes without intervention of the other nodes. The management system or one of the plurality of nodes is configured to determine number of storage drives to be included in a new distribution range to distribute data of a first volume based on access frequency to the first volume.

An aspect of this invention enables faster rebuild but prevents degradation of I/O performance in a storage system including a plurality of nodes.

BRIEF DESCRIPTION OF THE DRAWINGS

FIG. 6 is an example of a volume management table;

FIG. 7 is an example of a pool management table;

FIG. 8 is an example of a throughput management table;

FIG. 9 is an example of an allocated area management table;

DETAILED DESCRIPTION OF THE EMBODIMENTS

Hereinafter, some embodiments are described with reference to the accompanying drawings. The following embodiments are not to limit the invention recited in the claims and all the elements and combinations thereof described in the embodiments are not necessary to solve the problems addressed by this invention.

In the following description, information may be expressed as, for example, "aaa table"; however, the information can be expressed in data structures other than tables. To imply the independency from the data structure, the "aaa table" can be referred to as "aaa information".

The following description includes descriptions having a subject of a program to describe processing; however, such descriptions may be replaced by those having a subject of a processor because a program is executed by a processor (for example, a central processing unit (CPU)) to perform predetermined processing using storage resources (for example, a memory) and/or a communication interface device (for example, a port). In addition, the processing described with a subject of a program may be taken as the processing performed by a processor or the computer including the processor (for example, a management server, a host computer, or a storage apparatus).

A controller can be a processor itself or further include a hardware circuit to perform a part or all of the processing to be performed by the controller. A program can be installed to the controller of each node from a program source. The program source can be a program distribution server or storage media.

Figure 1:
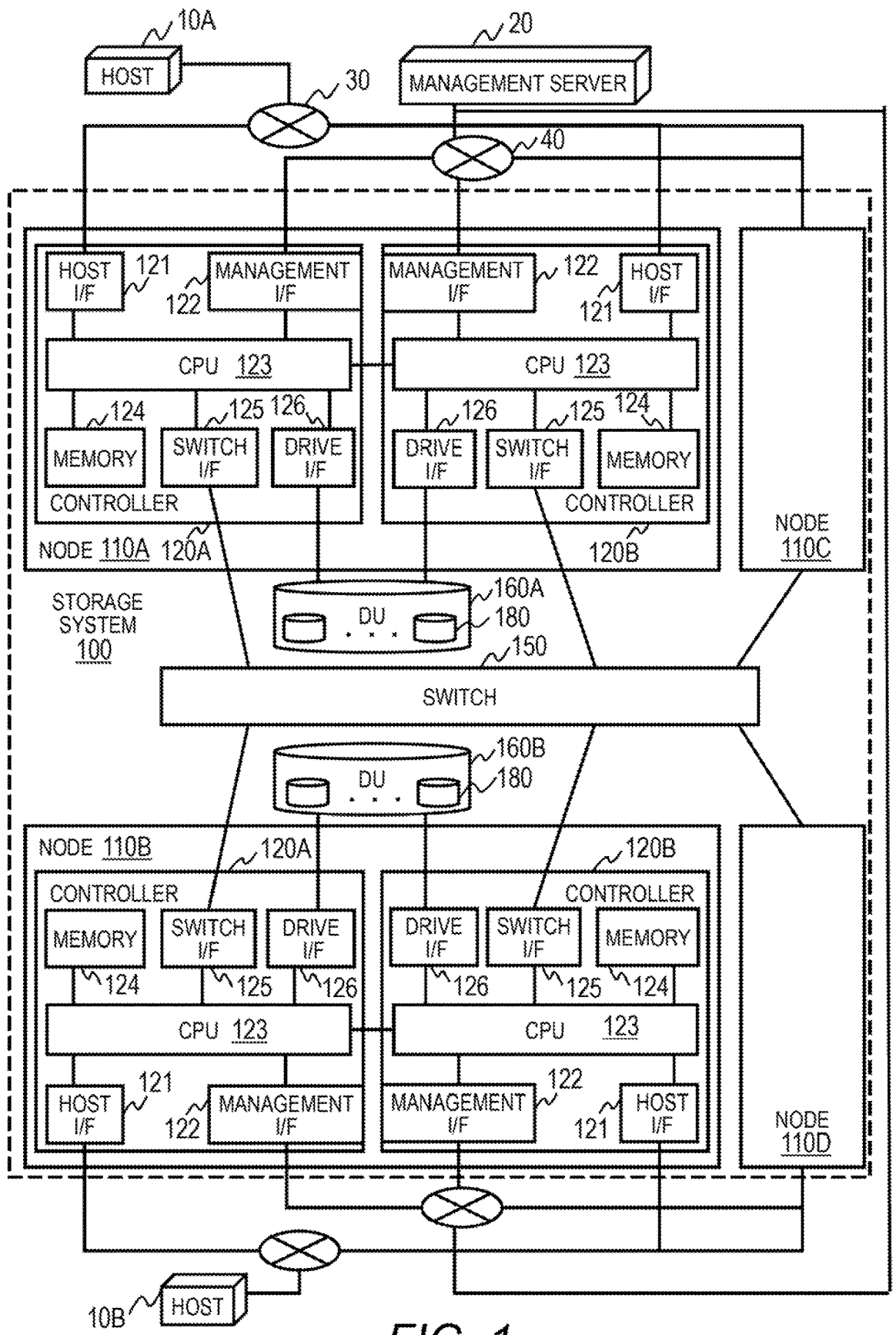
FIG. 1 illustrates a hardware configuration of a computer system.

Now, a general architecture of a computer system including a storage system is described. FIG. 1 illustrates a hardware configuration of the computer system. The computer system includes one or more host computers (hereinafter, referred to as hosts) 10A and 10B, a management server 20, and a storage system 100. The host computers 10A and 10B, the management server 20, and the storage system 100 are connected with one another through a network 40. The network 40 can be a local area network (LAN) or a wide area network (WAN).

The hosts 10A and 10B are connected with the storage system 100 through a network 30. The network 30 is a network for data communication and is a storage area network (SAN) in this configuration. The network 30 can be a network other than SAN, such as an IP network, as far as it is a network for data communication. The networks 30 and 40 can be the same network.

The hosts 10A and 10B are computers for running an application; they retrieve data to be used by the application from the storage system 100 and write data generated by the application to the storage system 100. The management server 20 is a management system to be used by the administrator. Although the management system in the example of FIG. 1 is one computer, the management system can be configured with a plurality of computers. The management server 20 can be integrated into one of the computer nodes. The management server 20 configures and controls the storage system 100 in accordance with operations of an input device by the administrator.

The storage system 100 includes a plurality of computer nodes (hereinafter, also referred to as nodes) 110A to 110D. The computer nodes 110A to 110D are connected through a switch 150 to communicate with one another. The computer nodes 110A and 110D in the example of FIG. 1 have the same elements. The internal elements of the computer nodes 110C and 110D are omitted from FIG. 1.

Each of the computer nodes 110A to 110D includes two controllers 120A and 120B connected by a bus. The controllers 120A and 120B have the same configuration. For example, the controller 120A includes a host interface (I/F) 121, a management I/F 122, a CPU 123, a memory 124, a switch I/F 125, and a drive I/F 126. These elements are connected by an internal bus. The controllers 120A and 120B do not have to include equal number of elements.

The host I/F 121 is an interface for connecting the storage system 100 to the hosts through the network 30 and the management I/F 122 is an interface for connecting the storage system 100 to the management server 20 through the network 40.

Each of the computer nodes 110A to 110D is connected with a drive unit (DU) consisting of a plurality of storage drives 180 (also merely referred to as drives) through the drive I/F 126. The storage drives 180 are physical storage drives. Each storage drive 180 includes a non-volatile or volatile storage medium, such as a magnetic disk, a flash memory, or a semiconductor memory other than flash memory.

FIG. 1 includes DUs 160A and 160B that can be accessed directly from the computer nodes 110A and 110B respectively, by way of example. One computer node (the CPU thereof) can access one or more DUs. The other computer nodes 110C and 110D are also connected with not-shown DUs through the drive I/Fs 126.

A DU that can be accessed directly from a computer node (a CPU 123 thereof) is a DU accessible from the computer node without intervention of any other computer node. A command and read/write data are transmitted without being transferred through any component of other computer nodes. Each of the computer nodes 110A and 110D communicates with a directly accessible DU through the drive I/F 126.

The DUs and storage drives accessible directly from a computer node are referred to as local DUs and local drives of the computer node. The DUs and storage drives accessible indirectly from a computer node or the DUs and storage drives accessible via another node are referred to as remote DUs and remote drives of the computer node.

The drive I/F 126 communicates various commands, write data, and read data with the storage drives 180 in a DU. The drive I/F 126 includes a transfer buffer to temporarily store data sent from a storage drive 180 or data to be sent to a storage drive 180.

The memory 124 stores a variety of programs and information. The memory 124 includes a cache area. The cache area is to temporarily store data (write data) to be written by a host to a storage drive 180 and data (read data) retrieved from a storage drive 180.

The CPU 123 executes programs stored in the memory 124 to perform a variety of processing. The CPU 123 sends various commands (such as a SCSI READ command and a SCSI WRITE command) through the drive I/F 126 to the storage drives 180 in a DU. The CPU 123 also sends various commands to other computer nodes or indirectly accessible DUs through the switch I/F 125.

Figure 2:
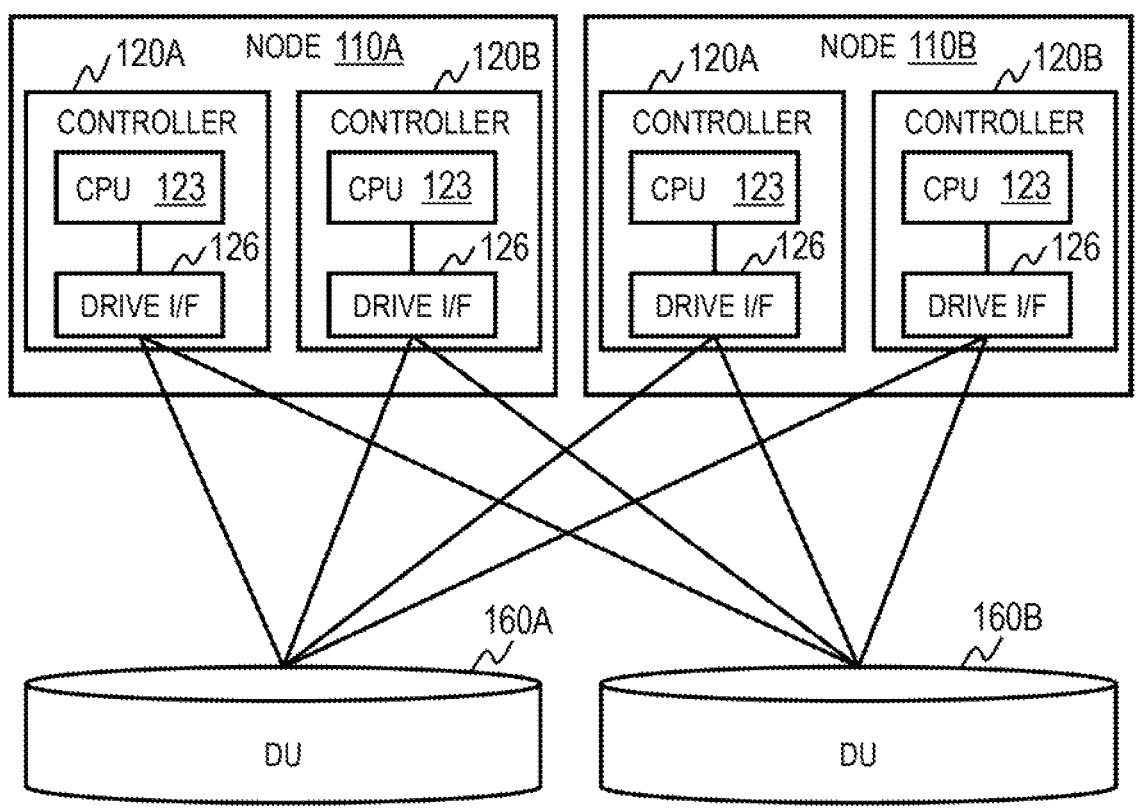
FIG. 2 illustrates an example of a redundancy configuration of backend connection.

FIG. 2 illustrates an example of a redundancy configuration of backend connection. In FIG. 1, direct access to one DU is available from only one computer node. In the backend connection configuration in FIG. 2, multiple computer nodes can access the same DU. Specifically, both of the computer nodes 110A and 110B are connected with the DU 160A through their drive I/Fs 126. Furthermore, both of the computer nodes 110A and 110B are connected with the DU 160B through their drive I/Fs 126.

In the example of FIG. 2, one computer node can directly access a plurality of DUs. Specifically, the computer node 110A is connected with the DUs 160A and 160B through its drive I/F 126. The computer node 110B is connected with the DUs 160A and 160B through its drive I/F 126 in the same way.

Figure 3:
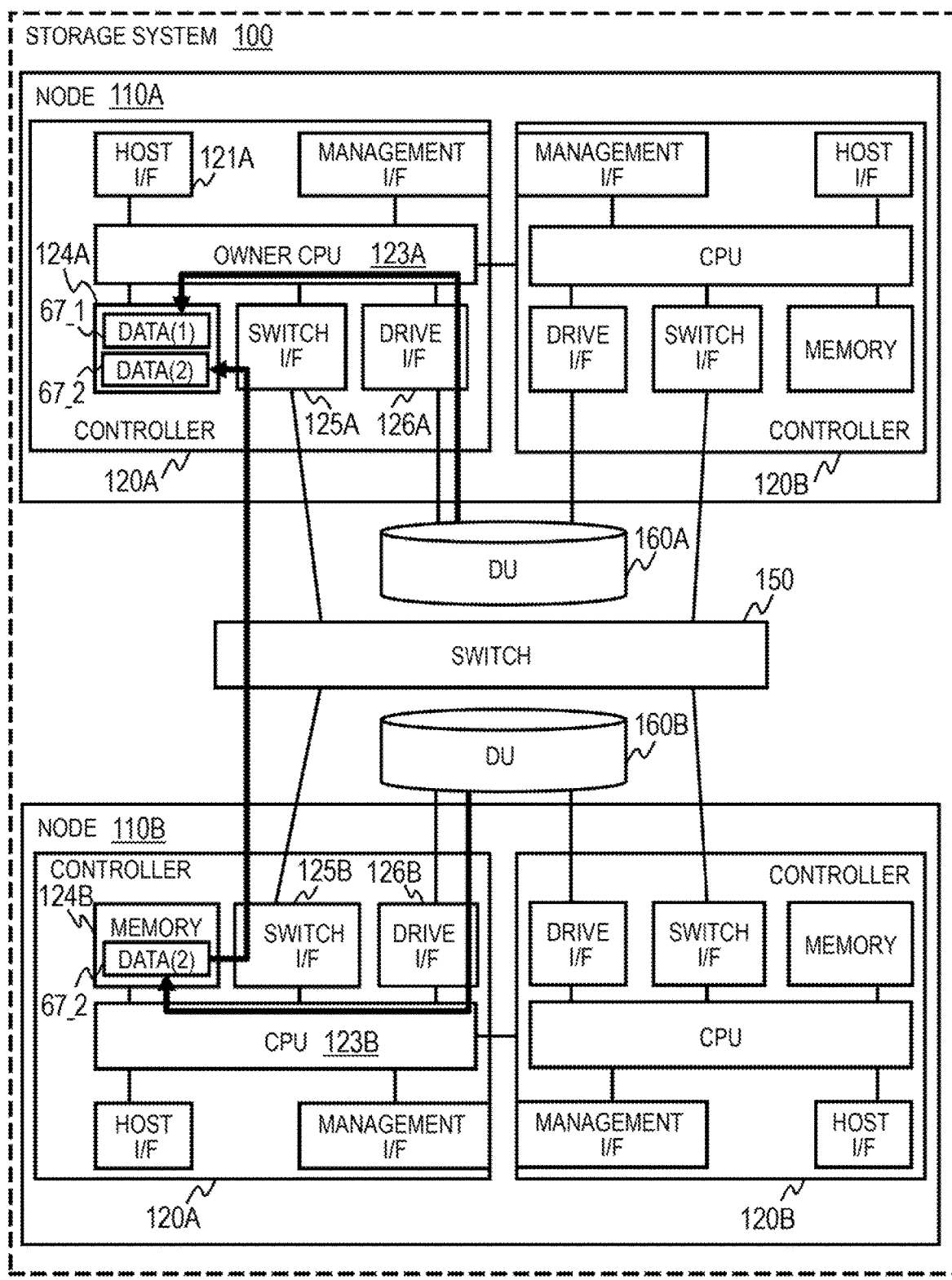
FIG. 3 illustrates an example of data transfer in a storage system.

FIG. 3 illustrates an example of data transfer in the storage system 100. The owner CPU 123 that receives an I/O request from a host accesses a local DU through the drive I/F 126 or accesses a remote DU via the switch 150 and another computer node.

In the example of FIG. 3, the node 110A is the owner node of the volume to be accessed and the CPU 123A of the node 110A is the owner CPU. The owner CPU 123A provides a volume to the host. The owner CPU 123A receives a read request for the volume and returns the designated read data to the host.

In the example of FIG. 3, the owner CPU 123A receives a read request for DATA (1) 67_1 stored in the directly accessible DU 160A. The owner CPU 123A sends a read command designating the address of the DATA (1) 67_1 to the drive I/F 126A of the computer node 110A.

The drive I/F 126A acquires the DATA (1) 67_1 from the DU 160A and stores the DATA (1) 67_1 to the memory 124A of the computer node 110A. Through the foregoing operations, the DATA (1) 67_1 is staged from the DU 160A.

The owner CPU 123A receives another read request for DATA (2) 67_2 stored in the remote DU 160B. The owner CPU 123A can access the DU 160B through another computer node 110B. The owner CPU 123A sends a read command designating the address of the DATA (2) 67_2 to the computer node 110B via the switch I/F 125A and the switch 150.

The CPU 123B of the computer node 110B sends the read command received from the switch I/F 125B to the drive I/F 126B of the node 110B. The drive I/F 126B acquires the DATA (2) 67_2 from the DU 160B and stores the DATA (2) 67_2 to the memory 124B of the computer node 110B.

The switch I/F 125B of the computer node 110B sends the DATA (2) 67_2 in the memory 124 to the computer node 110A via the switch 150. The switch I/F 125A of the computer node 110A transfers the received DATA (2) 67_2 to the memory 124A of the node 110A. Through the foregoing operations, the DATA (2) 67_2 is staged from the DU 160B.

In place of the CPU 123B of the computer node 110B, the switch 150 may send the read command to the drive I/F 126B of the node 110B. The read command is written to the drive I/F 126B without intervention of the CPU 123B. The DATA (2) 67_2 is stored to the memory 124B without intervention of the CPU 123B.

Figure 4A:
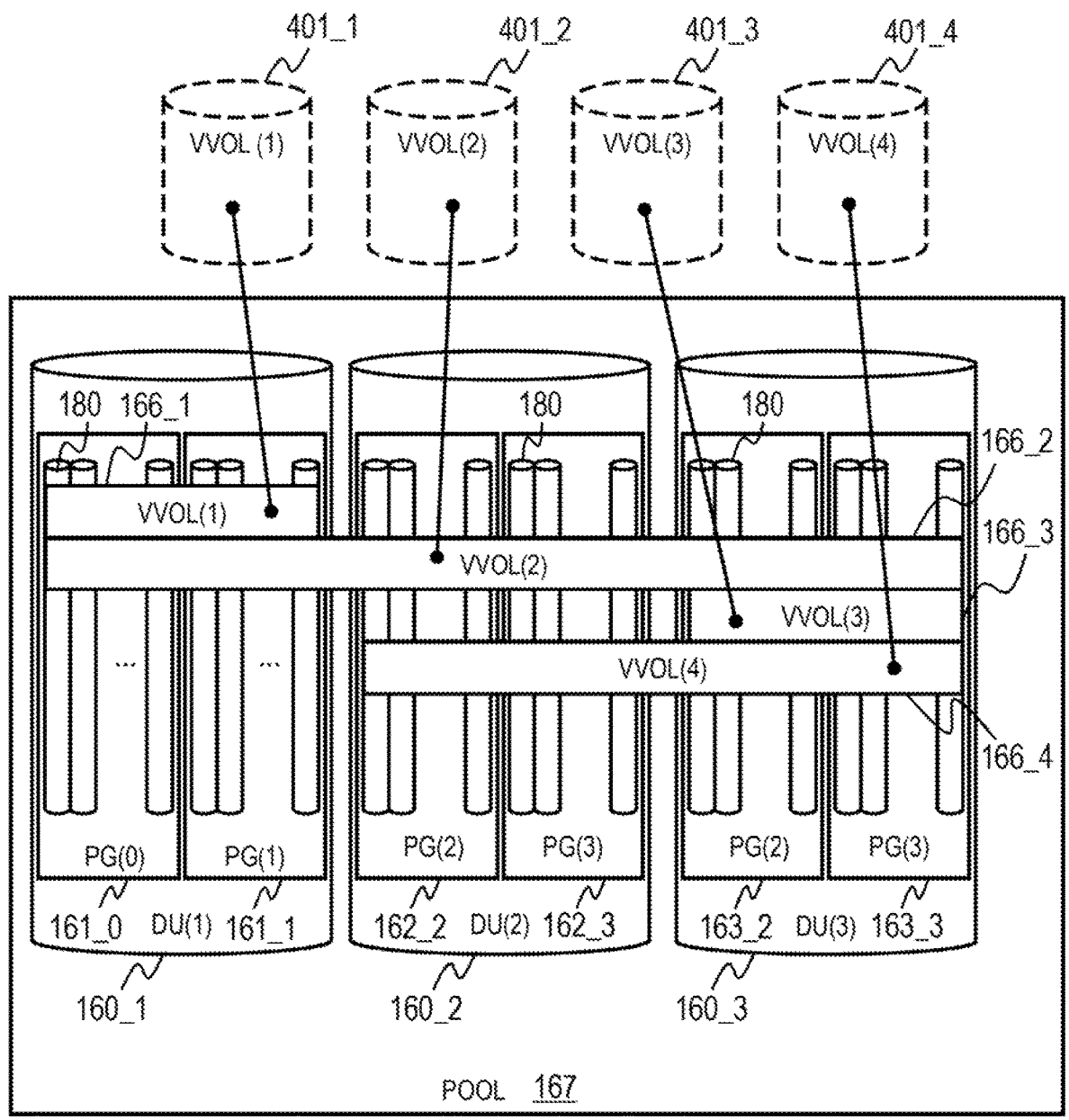
FIG. 4A illustrates examples of relations between volumes provided to a host and physical storage areas allocated to the volumes.

FIG. 4A illustrates examples of relations between volumes provided to the host and physical storage areas allocated to the volumes. In FIG. 4A, a plurality of virtual volumes (VVOLs) are provided. Specifically, four VVOL (1) 401_1 to VVOL (4) 401_4 are provided to one or more hosts.

A virtual volume is a virtual storage device and can be accessed from a host. The administrator of the storage system 100 creates a desired size of virtual volume using the management server 20. The size does not depend on the total capacity of the real storage drives 180. The CPU 123 allocates a storage area (physical storage area) from a plurality of storage drives 180 for a unit of virtual storage area (VVOL page) accessed by a host for a new write. The technique of this disclosure is applicable to logical volumes having a size equal to the size of the physical storage areas allocated thereto.

The VVOL (1) 401_1 to VVOL (4) 401_4 are allocated storage areas from a capacity pool (also simply referred to as pool) 167. The VVOL (1) 401_1 to VVOL (4) 401_4 are allocated storage areas only from the pool 167. The pool 167 is composed of storage areas of six parity groups (PGs) in three DUs. A PG is a group of storage drives 180.

Specifically, the six PGs are the PG (0) 161_0 and PG (1) 161_1 of the DU (1) 160_1, the PG (2) 162_2 and PG (3) 162_3 of the DU (2) 160_2, and the PG (2) 163_2 and PG (3) 163_3 of the DU (3) 160_3. The DU (1) 160_1 to DU (3) 160_3 each include PGs other than the PGs shown in FIG. 4A.

A PG consists of multiple, for example eight, storage drives 180. The PG is a unit of addition to or removal from the pool. In the example of this disclosure, the storage drives 180 in one PG are of the same drive type (having the same capability and the same capacity). The number of storage drives per PG can be common or different in one pool.

As illustrated in FIG. 4A, the VVOL (1) 401_1 to VVOL (4) 401_4 are assigned distribution ranges 166_1 to 166_4. A distribution range specifies PGs to allocate storage areas to a VVOL and data of a VVOL is stored within the storage area corresponding to the distribution range.

For example, the distribution range 166_1 for the VVOL (1) 401_1 includes two PG (0) 161_0 and PG (1) 161_1 in the DU (1) 160_1. The distribution range in this example is defined with one or more DUs in one pool.

Figure 4B:
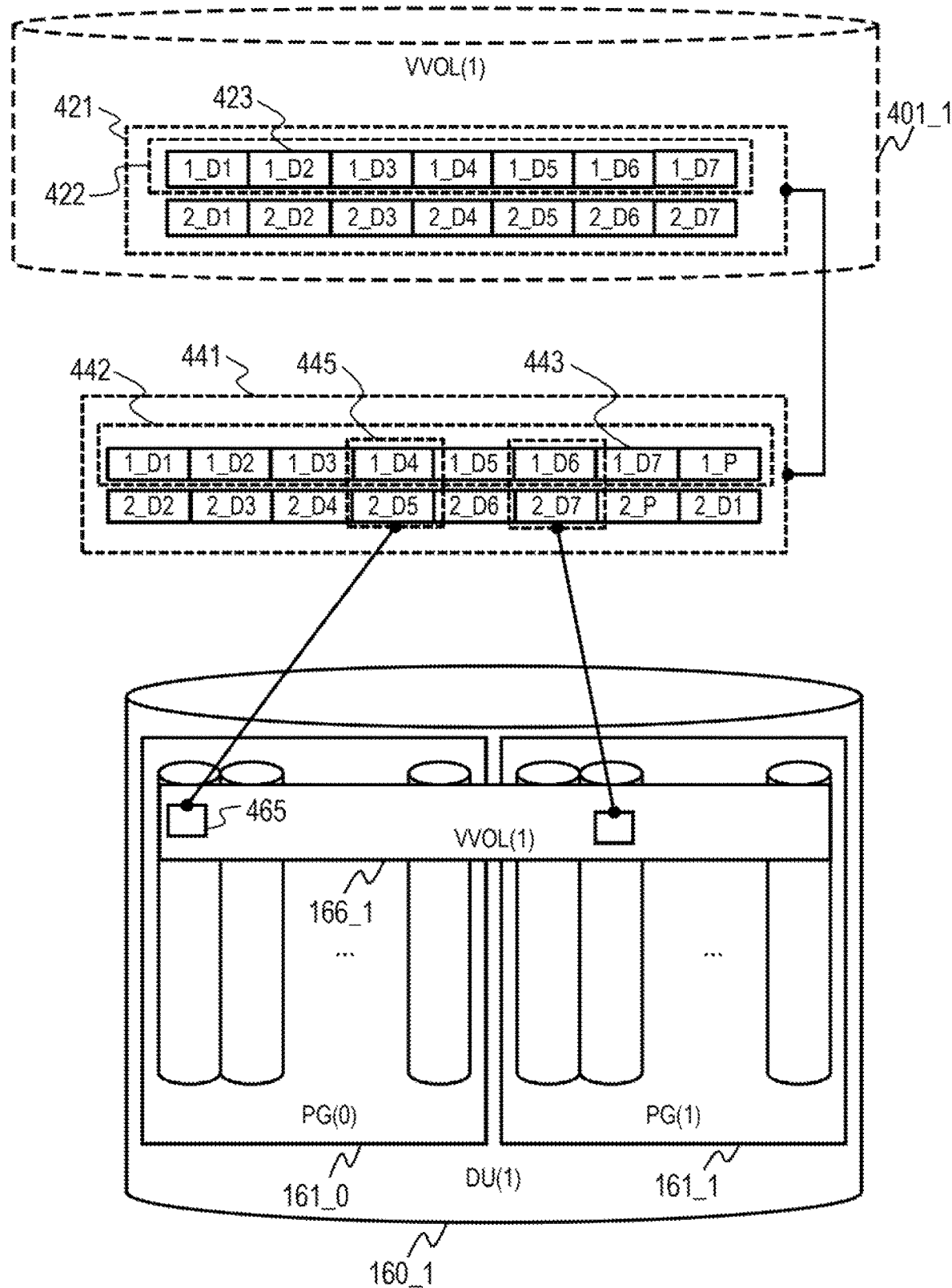
FIG. 4B illustrates an example of a relation between data configuration in a VVOL and data configuration in the physical storage area and an example of data storage locations in the physical storage area (data storage drives)

FIG. 4B illustrates an example of a relation between the data configuration in a VVOL and the data configuration in the physical storage area and an example of data storage locations in the physical storage area (data storage drives). Write data (user data) is stored in a VVOL page 421 of the VVOL (1) 401_1. The size of the VVOL page is predetermined and fixed. The VVOL page 421 is composed of a plurality of sub-areas 423. Each sub-area 423 is called a stripe.

In FIG. 4B, the VVOL page 421 consists of two stripe columns 422. A stripe column 422 stores a data unit of write data. The data designated by the host as write data is divided into predetermined size of data units; each data unit is divided into a plurality of data elements; and each data element is stored in a stripe 423.

The size of a stripe column 422 and the number of stripe columns 422 included in a VVOL page 421 are predetermined and fixed. The number of stripes 423 included in one stripe column 422 accords with the RAID (Redundant Arrays of Independent Disks) configuration of the distribution range 166_1.

The CPU 123 generates a parity for restoring data elements unreadable because of a failure of a storage drive 180 in case of occurrence such a failure. For example, for a data unit of a RAID group configured under RAID 5, the CPU 123 generates a P parity by calculating the exclusive logical sum (XOR) of the plurality of data elements constituting the data unit.

For a data unit of a RAID group configured under RAID 6, the CPU 123 further generates a Q parity by multiplying the plurality of data elements constituting the data unit by a predetermined coefficient and calculating the exclusive logical sum thereof. The CPU 123 performs restoration processing to restore a data element in a data unit based on one or more data elements (data elements and/or the parity) related to the data unit.

To achieve data redundancy, technology of triplication or triple parity can be employed. Still other redundancy code generation technology such as Reed Solomon coding or EVEN-ODD can also be employed.

In the example of FIG. 4B, the RAID configuration of the distribution range 166_1 is 7D1P. Accordingly, one stripe column 422 in a VVOL page 421 consists of seven stripes 423; each stripe 423 stores a data element of write data.

In FIG. 4B, the data elements and the parity having a common number preceding "_" like 1_D1, 1_D2, 1_D3, 1_D4, 1_D5, 1_D6, and 1_P are data elements and a parity in the same data unit (stripe column). Each of the data elements and the parity has the size of a stripe 423.

A VVOL page 421 is associated with a logical page 441. The logical page 441 consists of two stripe columns 442. Each stripe column 442 corresponds to a stripe column 422 of the VVOL page 421.

Each stripe column 442 of a logical page 441 includes stripes 443 (denoted by D1 to D7) for storing write data elements and in addition, a stripe 443 (denoted by P) for storing a redundant code (parity). In the logical page 441, the redundant code is stored in the same stripe column 442 as the write data.

The order of data elements in a stripe column in a logical page can be different from the order of data elements in the stripe column in the corresponding VVOL page. In the example of FIG. 4B, the order of write data elements in the stripe column 442 (denoted by 2) for the data unit 2 is different from the order of write data in the stripe column 422 (denoted by 2) in the corresponding VVOL page 421.

In a logical page 441, parcels 445 are defined. A parcel 445 is composed of stripes 443 in each stripe column 442 of the logical page 441. Accordingly, the logical page 441 is a parcel column composed of a plurality of parcels 445. Although each parcel 445 in the example of FIG. 4B consists of two stripes 443, a parcel 445 can consist of one or more stripes.

Data of a logical page 441 is distributed and stored within the distribution range 166_1 (the physical storage areas therein). In the example of FIG. 4B, the data of the logical page 441 is stored in the storage drives 180 in units of parcel. The CPU 123 selects a storage drive 180 to store data of each parcel 445 from the distribution range 166_1 in accordance with a predetermined algorithm. Any algorithm can be employed to distribute (assign) parcels 445 and an example thereof will be described later.

The distribution range 166_1 lies over two PGs of PG (0) 161_0 and PG (1) 161_1; in this example, they each consist of eight storage drives 180 in accordance with the 7D1P configuration. Accordingly, storage drives 180 to store eight parcels 445 are selected from sixteen storage drives 180. The combination of storage drives 180 to be selected is determined for each logical page.

The relations between the addresses of VVOL pages and the addresses of logical pages and the relations between the addresses of the logical pages and the addresses in the distribution range are managed in management information stored in each computer node.

As described above, selecting a combination of storage drives for each logical page from the storage drives 180 more than the parcels in the logical page achieves balancing the loads of rebuild at a failure of a storage drive among the storage drives 180 to complete the rebuild in a shorter time. An example of operations in rebuild is described.

For example, when one storage drive goes down, the storage system 100 allocates a spare area for the parcels included in the failed storage drive (by updating the management information) and conducts rebuild with the allocated spare area.

Assume that there are two PGs having 3D+1P configuration and all the eight storage drives are included in the distribution range. If there are three unbroken parcels belonging to the same stripe column as a parcel in the failed storage drive, the data lost from the failed storage drive can be restored by reading these three parcels from the unbroken storage drives.

The storage system 100 selects the three unbroken storage drives for each parcel from the seven unbroken storage drives so that the three unbroken storage drives will be well balanced among all the unbroken storage drives. Such coordination provides limitation to the maximum amount to be read from each unbroken storage drive. As a result, the rebuild performance improves, compared to the existing RAID system.

Figure 5:
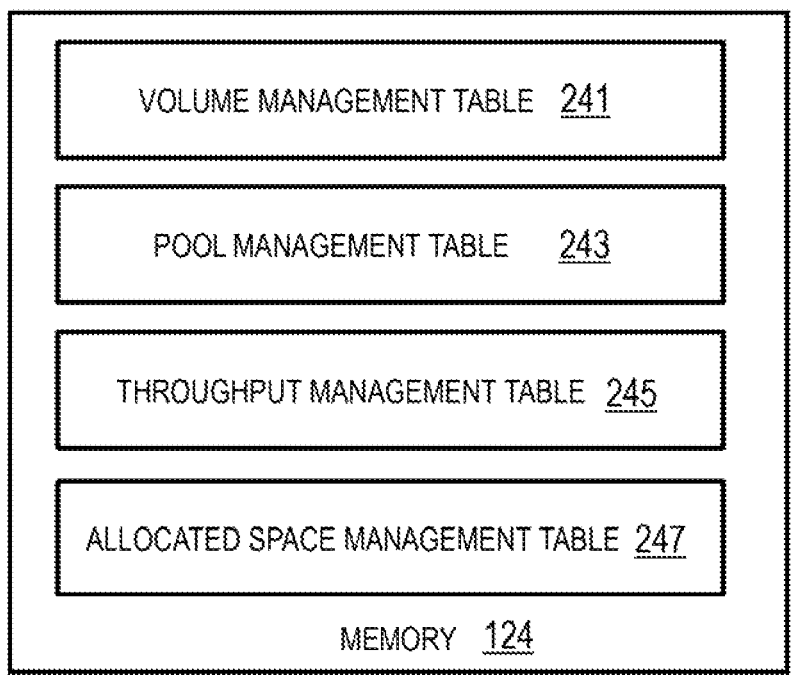
FIG. 5 illustrates management information stored in the memory of each computer node.

FIG. 5 illustrates management information stored in the memory 124 of each computer node. The information in FIG. 5 is stored in the shared area (shared memory) of the memory 124; the computer nodes individually hold the same management information. The memory 124 stores a volume management table 241, a pool management table 243, a throughput management table 245, and an allocated space management table 247.

FIG. 6 is an example of the volume management table 241. The volume management table 241 manages virtual volumes. A volume number field 411 indicates a volume number, or an identifier of a virtual volume. An owner node field 412 indicates the identifier of the owner node that provides the virtual volume to the host.

An automatic reallocation field 413 indicates whether the computer node is permitted to automatically change the distribution range of the data in the virtual volume. The value "1" means that the automatic reallocation is permitted and the value "0" means that the automatic reallocation is not permitted. The value of the automatic reallocation field 413 is assigned by the administrator (user). The value "1" can be assigned only for a pool in which all PGs have the same RAID configuration and all drives are of the same type.

An associated pool field 414 indicates the identifier of the pool the virtual volume belongs to, or the pool for providing a storage area to the virtual volume. A number-of-DUs field 415 indicates the number of DUs included in the distribution range for storing the data of the virtual volume. A distribution bitmap field 416 indicates the DUs included in the distribution range. For example, a distribution bitmap 00000101 indicates that the distribution range consists of DU (1) and DU (3); a distribution bitmap 11110000 indicates that the distribution range consists of DU (5), DU (6), DU (7), and DU (8).

A rebuild time field 417 indicates the estimated time to be taken for rebuild when one storage drive is failed. An I/O access count field 418 indicates the number of I/O accesses (I/O frequency) to the virtual volume per unit time. The access frequency of each virtual volume is monitored by the owner node, for example. The I/O access count can be an average in a predetermined period in the past and independent from the data unit or the amount of data. The I/O access count field 418 can be updated by the owner node at predetermined intervals.

FIG. 7 is an example of the pool management table 243. The pool management table 243 manages pools providing physical storage areas to virtual volumes. A pool number field 431 indicates a pool number, or an identifier of a pool. A DU number field 432 indicates a DU number of a DU included in the pool. A PG number filed 433 indicates a PG number of a PG included in the pool. The PG number is unique to a DU but another PG in a different DU can have the identical PG number.

A connected node field 434 indicates the identifiers of the nodes that can directly access the PG (DU). A number-of-drives field 435 indicates the number of storage drives included in the PG. A RAID field 436 indicates the RAID configuration of the PG, or the RAID configuration of the data stored in the PG. A drive type field 437 indicates the type of the storage drives included in the PG. A DU free space field 438 indicates the size of free space of the DU in the pool, or the size of the total free space in the PGs allocated from the DU to the pool.

FIG. 8 is an example of the throughput management table 245. The throughput management table 245 manages the values of throughput (specifications) of different types of devices. A first category field 451 indicates the type of a device. The example of FIG. 8 includes three types: HDD, SSD, and interface. A second category field 452 indicates a sub-type in the first category. For example, HDDs are categorized based on the combination of the capacity and the disk spin speed. A throughput field 453 indicates the specification value of the throughput of the device.

FIG. 9 is an example of the allocated space management table 247. The allocated space management table 247 manages the sizes of the spaces allocated from storage drives to virtual volumes. FIG. 9 shows the spaces of storage drives allocated to VVOL (0). A storage drive is identified with a DU number, a PG number, and a drive number. The DU number is unique to the storage system 100, the PG number is unique to a DU, and the drive number is unique to a PG. R(x, y, z) indicates the size of the space allocated from the storage drive identified by a PG number of x, a DU number of y, and a drive number of z to the virtual volume.

Figure 10:
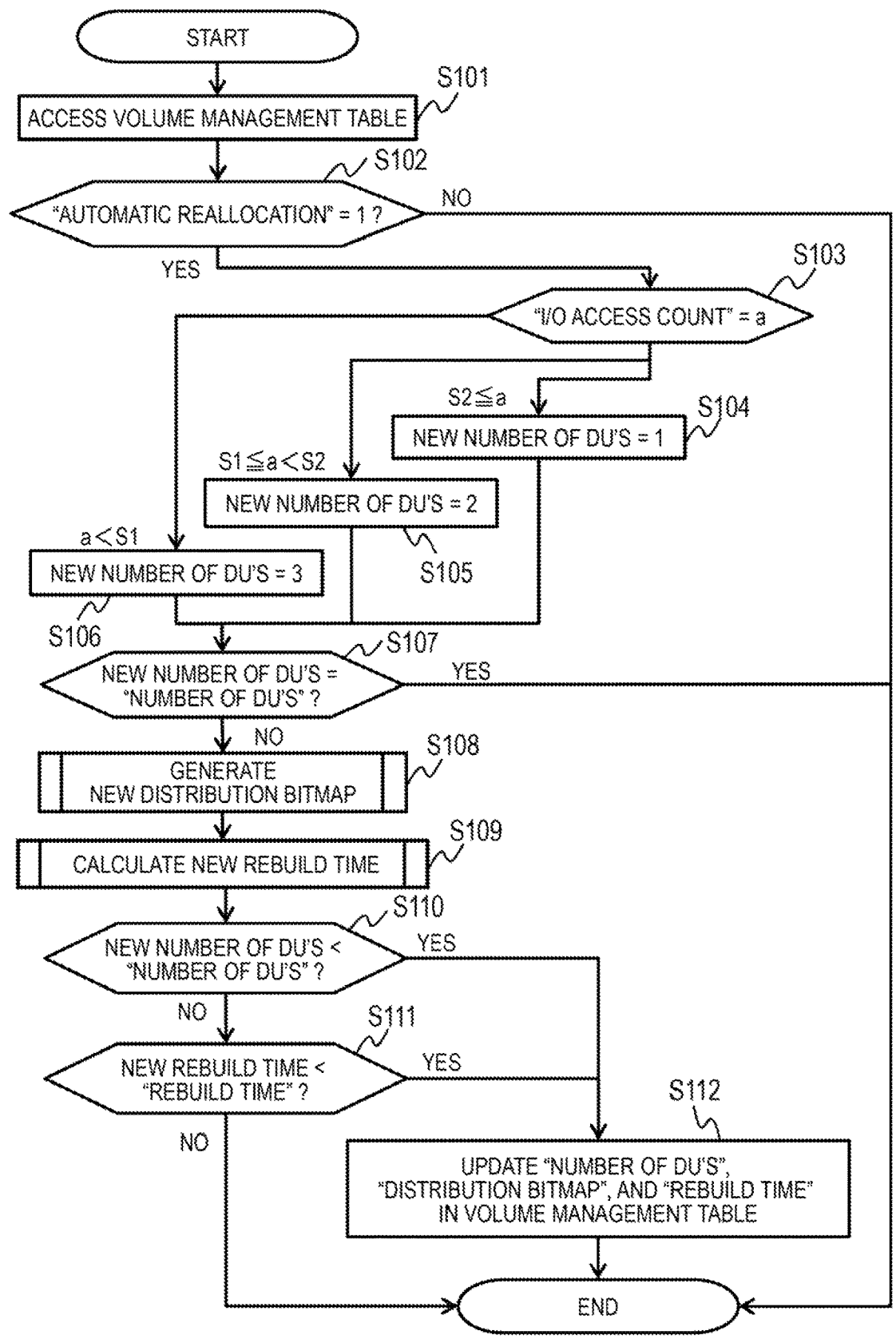
FIG. 10 is a flowchart of processing to change a distribution range of a virtual volume.

FIG. 10 is a flowchart of processing to change the distribution range of a virtual volume. One of the computer nodes, for example, the owner node of the virtual volume, performs this processing. Alternatively, the management server 20 may perform this processing. This processing can be performed periodically, for example, synchronously with updating the I/O access count of the virtual volume in the volume management table 241.

In FIG. 10, the CPU 123 accesses the volume management table 241 (S101) and determines whether the value of the automatic reallocation field 413 for this virtual volume is "1" (S102). As described above, the value "1" indicates that the automatic reallocation is permitted. If the value of the automatic reallocation field 413 is not "1" but "0" (S102: No), the CPU 123 terminates the processing without changing the distribution range.

If the value of the automatic reallocation field 413 is "1" (S102: Yes), the CPU 123 acquires the I/O access count of the virtual volume from the I/O access count field 418 of the volume management table 241 and assign the value to a variable a. The CPU 123 compares the acquired I/O access count with a plurality of predetermined thresholds to determine the numerical range including the acquired I/O access count (S103).

If the I/O access count is equal to or higher than the threshold S2 (S103: S2≤a), the CPU 123 determines the number of DUs in the new distribution range to be 1 (S104). If the I/O access count is equal to or higher than the threshold S1 and lower than S2 (S103: S1≤a<S2), the CPU 123 determines the number of DUs in the new distribution range to be 2 (S105). If the I/O access count is lower than the threshold S1 (S103: a<S1), the CPU 123 determines the number of DUs in the new distribution range to be 3 (S106). These numbers of DUs are examples.

The CPU 123 acquires the number of DUs in the current distribution range of the virtual volume from the number-of-DUs field 415 in the volume management table 241 and compares the acquired value with the number of DUs in the newly determined distribution range (S107). If the number of DUs in the current distribution range is equal to the number of DUs in the newly determined distribution range (S107: Yes), the CPU 123 terminates the processing without changing the distribution range.

If the number of DUs in the current distribution range is different from the number of DUs in the newly deter mined distribution range (S107: No), the CPU 123 generates a new distribution bitmap (S108). The details of generating a new distribution bitmap is described later. If no distribution bitmap is generated at Step S108, the CPU 123 terminates the processing.

The CPU 123 calculates the estimated time to be taken to rebuild the newly determined distribution range (S109). The rebuild time T for a distribution range depends on the bottleneck. The performance of the storage drive or the performance of the interface connecting computer nodes can become a bottleneck. Accordingly, the rebuild time T can be pertinently calculated by the following formula:

$$T = \mathrm{MAX}\left(\frac{C/N}{p_0}, \frac{C/N}{p_1}, \ldots, \frac{C/N}{p_{N-1}}, \frac{C(N-1)/N}{P_I}\right)$$

In this formula, N is the number of DUs included in the distribution range and C is the size of the space of the failed storage drive. Whether C is the capacity of the storage drive or the size of the allocated area depends on the implementation. In the case of the size of the allocated area, it is necessary to periodically check the value and therefore, the allocated space management table 247 is referred to.

$P_n$ (n=0, . . . N−1) is the throughput of a DU. Accordingly, Pn is equal to the throughput of the storage drives in the DU. $P_1$ is the throughput of the interface. The values of the throughput of the devices are acquired from the throughput management table 245.

The CPU 123 compares the number of DUs in the newly deter mined distribution range of the virtual volume with the number of DUs in the current distribution range (S110). If the number of DUs in the newly determined distribution range is smaller than the number of DUs in the current distribution range (S110: Yes), the CPU 123 updates the values of the number-of-DUs field 415, the distribution bitmap field 416, and the rebuild time field 417 for the virtual volume in the volume management table 241 with the newly generated distribution bitmap and the calculated new rebuild time (S112), and terminates the processing.

If the number of DUs in the newly determined distribution range is greater than the number of DUs in the current distribution range (S110: No), the CPU 123 acquires the current rebuild time for the virtual volume from the rebuild time field 417 in the volume management table 241 and compares the acquired value with the new rebuild time calculated at Step S109 (S111).

If the new rebuild time is equal to or longer than the current rebuild time (S111: No), the CPU 123 terminates the processing without changing the distribution range. If the new rebuild time is shorter than the current rebuild time (S111: No), the CPU 123 updates the values of the number-of-DUs field 415, the distribution bitmap field 416, and the rebuild time field 417 for the virtual volume in the volume management table 241 with the newly generated distribution bitmap and the calculated new rebuild time (S112), and terminates the processing.

As described above, allowing changing the distribution range only to the virtual volumes permitted automatic reallocation enables control satisfying the user's requirements. Dynamically determining the distribution range in accordance with the access count (access frequency) of the virtual volume prevents the I/O performance from degrading, while enabling faster rebuild.

Determining the number of DUs in the distribution range in accordance with the numerical range including the access frequency achieves small processing load in determining the number of DUs. Defining three or more numerical ranges enables more appropriate number of DUs to be determined in accordance with the access frequency. Cancelling the changing of the distribution range in the case where increasing the DUs in the distribution range increases the rebuild time enables determination of an appropriate distribution range for the system configuration.

To remove a DU from the current distribution range, the data of the virtual volume stored in the DU to be removed is reallocated to the DUs to be kept in the new distribution range. The data of a logical page has been distributed in units of parcel. For example, the owner node of the virtual volume reallocates the data in the logical pages stored in the DU to be removed to the new distribution range in accordance with the same rules as those described later with FIG. 12.

Figure 11:
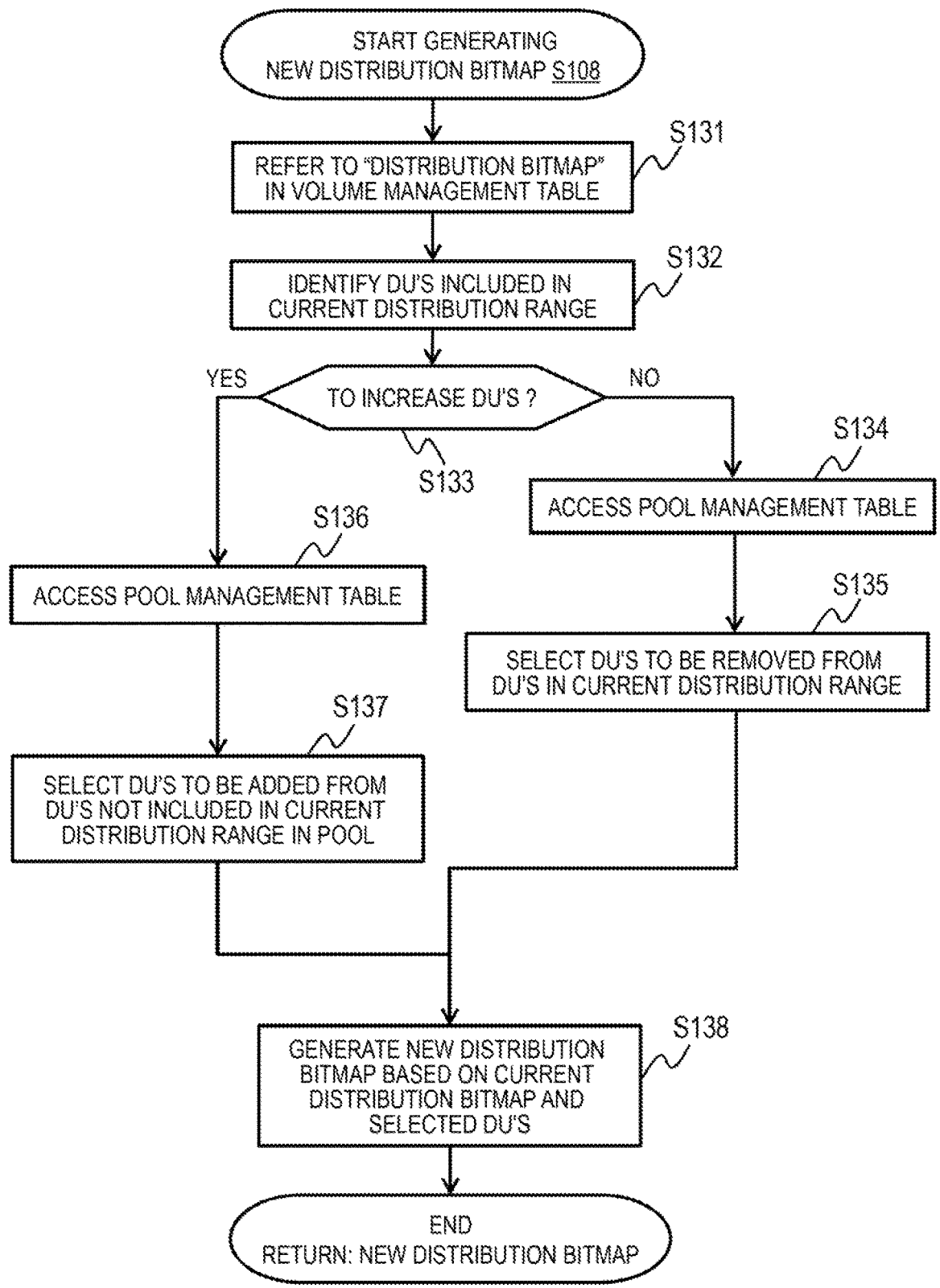
FIG. 11 is a flowchart of details of the step of generating a new distribution bitmap in FIG. 10.

FIG. 11 is a flowchart of details of the step of generating a new distribution bitmap (S108) in FIG. 10. The CPU 123 accesses the volume management table 241 and acquires the current distribution bitmap for the virtual volume from the distribution bitmap field 416 (S131).

The CPU 123 identifies the DUs included in the current distribution range of the virtual volume from the acquired distribution bitmap (S132). The current distribution range of the virtual volume is composed of PGs in the pool the virtual volume belongs to in each DU indicated in the distribution bitmap.

The CPU 123 compares the number of DUs in the current distribution range according to the current distribution bitmap with the number of DUs for the new distribution range determined at one of the Steps S104, S105, and S106 (S133).

If the number of DUs in the new distribution range is smaller than the number of DUs in the current distribution range (S133: No), the CPU 123 access the pool management table 243 (S134) and selects DUs to be removed from the current distribution range (S135). The CPU 123 selects DUs to be removed from the remote DUs (to which direct access is not available) for the owner node of the virtual volume in the current distribution range. The CPU 123 determines whether each of the DUs in the current distribution range is a remote DU or a local DU for the owner node of the virtual volume with reference to the connected node field 434.

If the current distribution range includes only local DUs (to which direct access is available) for the owner node of the virtual volume, the CPU 123 skips this step S135. The CPU 123 may select DUs to be removed from the local DUs.

If the number of remote DUs in the current distribution range is smaller than the number of DUs to be removed, the CPU 123 selects all the remote DUs other than the local DUs. The CPU 123 may select local DUs in addition to all remote DUs in the current distribution range. Alternatively, the CPU 123 may skip this Step S135.

Preferentially removing remote DUs for the owner node of the virtual volume and preferentially keeping local DUs in the new distribution range improve access performance in the new distribution range.

The CPU 123 selects DUs to be removed from the removable DUs in ascending order of the size of free space. The CPU 123 can know the size of free space in each DU with reference to the DU free space field 438. This policy reduces the possibility of depletion of free space in the new distribution range.

If local DUs and remote DUs are removable, the CPU 123 first selects remote DUs and then selects the deficient number of local DUs in accordance with the values of the free space. The CPU 123 preferentially removes remote DUs of the owner node of the virtual volume and further, preferentially removes DUs having smaller free spaces.

The factors in selecting a DU to be removed may be only either one of the connection between the owner node and the DU and the free space, or otherwise, may include an additional factor. In the selection factors, the free space may be prioritized over the connection between the owner node and the DU.

If the number of DUs in the new distribution range is greater than the number of DUs in the current distribution range (S133: Yes), the CPU 123 accesses the pool management table 243 (S136) and selects a DU to be added from the DUs not included in the current distribution range in the pool the virtual volume belongs to (S137). The CPU 123 selects DUs having the same RAID configuration and of the same drive type as the DUs in the current distribution range. The CPU 123 identifies the RAID configuration and the drive type of each DU with reference to the RAID field 436 and the drive type field 437.

Regarding the DUs to be selected as DUs to be added, the RAID configuration and the drive type should be common to all PGs in the pool. Only the virtual volumes belonging to the pool in which all PGs have the same RAID configuration and are of the same drive type can be permitted automatic reallocation (automatic reallocation fields 413 in the volume management table 241).

If the pool does not include any DU having the same RAID configuration and of the same drive type as the DUs in the current distribution range, the CPU 123 skips this Step S137. If the number of DUs having the same RAID configuration and of the same drive type as the DUs in the current distribution range is smaller than the number of DUs to be added, the CPU 123 adds all DUs having the same RAID configuration and of the same drive type as the DUs in the current distribution range. Alternatively, the CPU 123 may skip this step S137.

If the number of DUs having the same RAID configuration and of the same drive type as the DUs in the current distribution range is equal to or greater than the number of DUs to be added, the CPU 123 selects DUs to be added in descending order of the size of free space. The CPU 123 can know the remaining space of each DU with reference to the DU free space field 438. This policy reduces the possibility of depletion of free space in the new distribution range.

Before referring to the free spaces, the CPU 123 may preferentially select local DUs of the owner node of the virtual volume as DUs to be added over remote DUs. This policy prevents degradation in I/O performance in the new distribution range.

After selecting the DUs to be removed (S135) or selecting the DUs to be added (S137) as described above, the CPU 123 generates a new distribution bitmap based on the current distribution range and the selected DUs (S138). The generated new distribution bitmap is the output of Step S108 in the flowchart of FIG. 10.

The above-described example dynamically changes the number of DUs in a distribution range in accordance with the access frequency. The storage system 100 may dynamically change a different type of drive group such as the number of PGs in accordance with the access frequency. Changing the number of DUs or the number of PGs in a distribution range corresponds to determining the number of storage drives in the distribution range.

Figure 12:
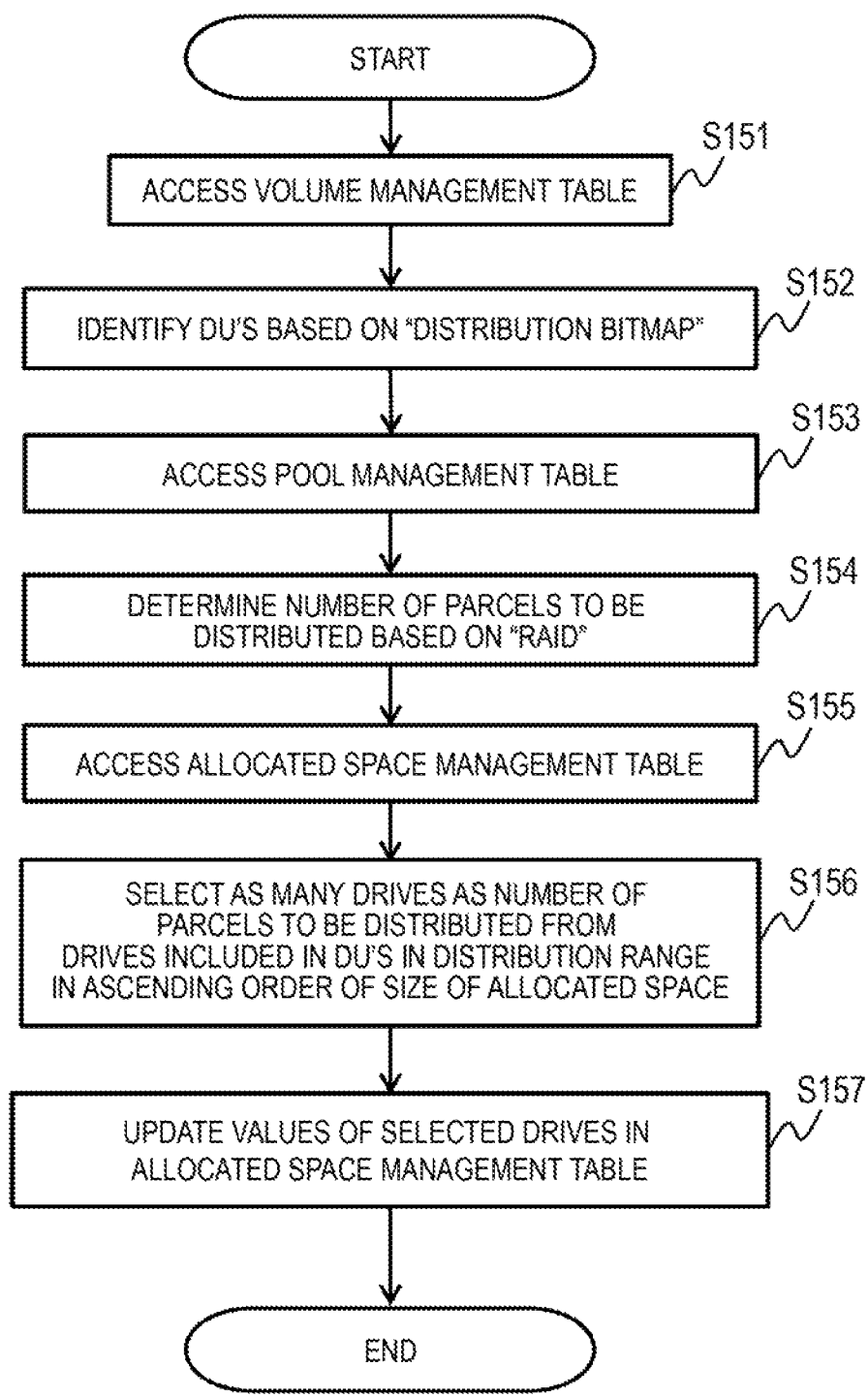
FIG. 12 is a flowchart of processing to distribute parcels to the storage areas of storage drives.

FIG. 12 is a flowchart of processing to distribute parcels to the storage areas of storage drives. The distribution method described hereinafter is merely an example; another algorithm can be employed. Upon receipt of a new write access to a virtual volume or a write access to an unused VVOL page, the CPU 123 allocates storage areas of storage drives to the VVOL page. In another case of rearrangement of a logical page, the CPU 123 allocates storage areas of storage drives to the logical page. As described with reference to FIG. 4B, the storage area of each storage drive is allocated in units of parcel.

As illustrated in FIG. 12, the CPU 123 accesses the volume management table 241 (S151), acquires the distribution bitmap of the virtual volume to be accessed from the distribution bitmap field 416, and identifies the DUs in the distribution range (S152).

Next, the CPU 123 accesses the pool management table 243 (S153) and determines the number of necessary parcels with reference to the RAID field 436 (or the number-of-drive field 435) (S154). For example, in the case of RAID configuration of 7D1P, the number of necessary parcels is eight.

Next, the CPU 123 accesses the allocated space management table 247 (S155), selects the DUs included in the distribution range from the entry of the virtual volume, and selects as many storage drives as the number of necessary parcels in ascending order of the size of the allocated space from the selected DUs (S156). This policy enables the storage drives to equally store data, achieving load balancing among the storage drives.

After storing data of the parcels to the selected storage drives, the CPU 123 updates the corresponding entries of the allocated space management table 247 with the values increased by the sizes of the spaces allocated to the parcels (S157). Through the foregoing operations, the processing of this flowchart is completed.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated to a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card or an SD card.

The drawings show control lines and information lines as considered necessary for explanations but do not show all control lines or information lines in the products. It can be considered that most of all components are actually interconnected.

What is claimed is:

1. A storage system that improves a rebuild of a spared drive and prevents degradation of I/O performance, the storage system comprising:
   a plurality of nodes interconnected via a network, wherein each of the plurality of nodes is configured to provide volumes;
   a plurality of storage drives that are interconnected via the network; and
   a management system that is communicatively coupled to the plurality of nodes and the plurality of storage drives,
   wherein each of the plurality of storage drives is accessible from one or more of the plurality of nodes without intervention of the other nodes, and
   wherein the management system or one of the plurality of nodes is configured to determine a number of storage drives to be included in a new distribution range based on access frequency to a first volume and based on a rebuild time of each storage drive included in the new distribution range, wherein the new distribution range distributes data of the first volume.

2. The storage system according to claim 1, wherein the management system or the one of the plurality of nodes is configured to determine that the new distribution range comprises storage drives accessible from an owner node providing the first volume without intervention of the other nodes in a case where the access frequency is equal to or higher than a first threshold.

3. The storage system according to claim 1, wherein the management system or the one of the plurality of nodes is configured to:
   compare the access frequency with a plurality of thresholds to determine a range including the access frequency; and
   determine a number of storage drives associated with the determined range to be a number of storage drives to be included in the new distribution range.

4. The storage system according to claim 1, wherein the management system or the one of the plurality of nodes is configured to preferentially keep storage drives accessible from an owner node providing the first volume without intervention of the other nodes in a case where the determined number of storage drives to be included in the new distribution range is smaller than a number of storage drives included in a current distribution range.

5. The storage system according to claim 1, wherein the management system or the one of the plurality of nodes is configured to determine storage drives to be removed from a current distribution range of the first volume based on sizes of free spaces of storage drives included in the current distribution range.

6. The storage system according to claim 1, wherein the management system or the one of the plurality of nodes is configured to:
   estimate a rebuild time under a condition of a number of storage drives in a current distribution range and a rebuild time under a condition of a number of storage drives in the new distribution range in a case where the determined number of storage drives to be included in the new distribution range is greater than the number of storage drives included in the current distribution range; and
   determine to maintain the current distribution range in a case where the estimated rebuild time under the condition of the number of storage drives in the new distribution range is longer than the estimated rebuild time under the condition of the number of the storage drives in the current distribution range.

7. The storage system according to claim 6, wherein the estimating the rebuild times refers to throughputs of storage drives in each distribution range and throughputs of interfaces between nodes.

8. The storage system according to claim 1, wherein the management system or the one of the plurality of nodes is configured to determine storage drives to be added to a current distribution range of the first volume based on sizes of free spaces of storage drives not included in the current distribution range.

9. The storage system according to claim 1, wherein the management system or the one of the plurality of nodes is configured to:
   determine that the new distribution range comprises storage drives accessible from an owner node providing the first volume without intervention of the other nodes in a case where the access frequency is equal to or higher than a first threshold;
   estimate a rebuild time under a condition of a number of storage drives in a current distribution range and a rebuild time under a condition of a number of storage drives in the new distribution range in a case where the determined number of storage drives to be included in the new distribution range is greater than the number of storage drives included in the current distribution range; and determine to maintain the current distribution range in a case where the estimated rebuild time under the condition of the number of storage drives in the new distribution range is longer than the estimated rebuild time under the condition of the number of storage drives in the current distribution range.

10. A method of controlling a storage system including a plurality of storage drives and a plurality of nodes interconnected via a network and configured to provide volumes, each of the plurality of storage drives being accessible from one or more of the plurality of nodes without intervention of the other nodes, and the method comprising:

monitoring access frequency to a first volume; and determining a number of storage drives to be included in a new distribution range to distribute data of the first volume based on a result of monitoring the access frequency and based on a rebuild time of each storage drive included in the new distribution range, wherein the new distribution range distributes data of the first volume.

* * * * *